United States Patent

Beck et al.

[15] 3,640,483

[45] Feb. 8, 1972

[54] TAPE REEL AND TAPE-THREADING SYSTEM

[72] Inventors: Fred R. Beck, Glen Ellyn; Robert J. Fanella, Villa Park; Norman F. Gioia, Lombard, all of Ill.

[73] Assignee: Ampex Corporation, Redwood City, Calif.

[22] Filed: Nov. 6, 1969

[21] Appl. No.: 874,495

[52] U.S. Cl. .......... 242/74.1, 242/195

[51] Int. Cl. .......... B65h 75/28, G03b 1/04

[58] Field of Search .......... 242/195, 71.8, 71.9, 74–74.2; 197/175

[56] References Cited

UNITED STATES PATENTS

| | | | |
|---|---|---|---|
| 3,181,807 | 5/1965 | Thevenaz | 242/71.2 |
| 3,201,059 | 8/1965 | Winkel | 242/74.1 |
| 3,265,318 | 8/1966 | Ellmore | 242/74 |
| 3,339,859 | 9/1967 | Yomine | 242/74 |
| 3,378,212 | 4/1968 | Johnson | 242/210 |
| 3,393,790 | 7/1968 | Dixon | 197/175 |

*Primary Examiner*—Leonard D. Christian
*Attorney*—Fitch, Even, Tabin and Luedeka

[57] ABSTRACT

A leading end of a tape is readily threaded between a pair of gripping members which are movable from a tape-threading position in which a slot is formed therebetween to receive the leading end of the tape and a tape gripping position in which the gripping members move to grip the tape end therebetween. An actuator in the form of a pushbutton may be used to shift the gripping members relative to one another and into the tape-gripping position. Preferably, the tape end is released automatically by the gripping members when the tape is uncoiled.

10 Claims, 5 Drawing Figures

INVENTORS
FRED R. BECK
ROBERT J. FANELLA
NORMAN F. GIOIA

Anderson, Luedeka, Fitch, Even & Tabin
ATTYS.

INVENTORS
FRED R. BECK
ROBERT J. FANELLA
NORMAN F. GIOIA

Anderson, Luedeka, Fitch, Even & Tabin
ATTYS.

INVENTORS
FRED R. BECK
ROBERT J. FANELLA
NORMAN F. GIOIA

Anderson, Luedeka, Fitch, Even & Tabin
ATTYS.

TAPE REEL AND TAPE-THREADING SYSTEM

This invention relates to a tape reel and a tape-threading system and, more particularly, to a tape reel and tape-threading system for facilitating insertion and connection of a tape to reels used on devices or machines such as magnetic tape recorders.

A number of various approaches have been tried in the prior art to facilitate insertion and connection of the leading tape end of a tape to a reel. For instance, the tapes have been provided with hooks, strips of felt, loops in the tape, or stiff and wide portions which are expensive to manufacture and which are not standardized for use with many of the presently manufactured tape recorders and which are subject to failure before the useful recording life of the tape itself is exhausted. In accordance with another approach, tape reels have been slotted in the flanges or in the hubs thereof, but such slotted reels are difficult to thread, particularly by inexperienced operators using tape recorders in the home. Many of the prior art tape-threading and connection systems require a relatively precise orientation of the reel and a considerable area of access to the reel before the leading end of the tape may be inserted into and attached to the reel.

Improved manners of attaching a leading end of tape to a reel are disclosed in Ellmore U.S. Pat. No. 3,265,318 and in Yomine U.S. Pat. No. 3,339,859 which disclose tape reels having a hub with a base and upstanding teeth spaced about the periphery of the hub to receive the leading end of the tape between the teeth of the hub. In the systems disclosed in these patents, the leading portion of the tape is inserted edgewise through an elongated slot in a reel cover disposed above a reel and is inserted into the space between the teeth so that, when the reel is caused to rotate, the teeth engage the tape and begin to wind it on the reel. The leading end of the tape extends considerably beyond the hub or reel and is held between friction pads disposed on opposite edges at the end of the tape-receiving slot. During the initial turning movement of these reels, the tape and extending beyond the reels pulls free of the friction pad, turns and strikes the cover thereby producing a ticking sound until the leading tape end is wound within the initial coils wound on the reel. Also, this long leading end may, on occasion, become wound about the reel hub and, when the reel is driven in a reverse direction for rewinding, the leading end may be caught by the teeth and break rather than sliding free from the teeth.

Accordingly, an object of the present invention is to provide a new and improved, as contrasted with the prior art, reel and tape-threading system.

Other objects and advantages of the invention will become apparent from the detailed description taken in connection with the accompanying drawings in which.

Figure 1:
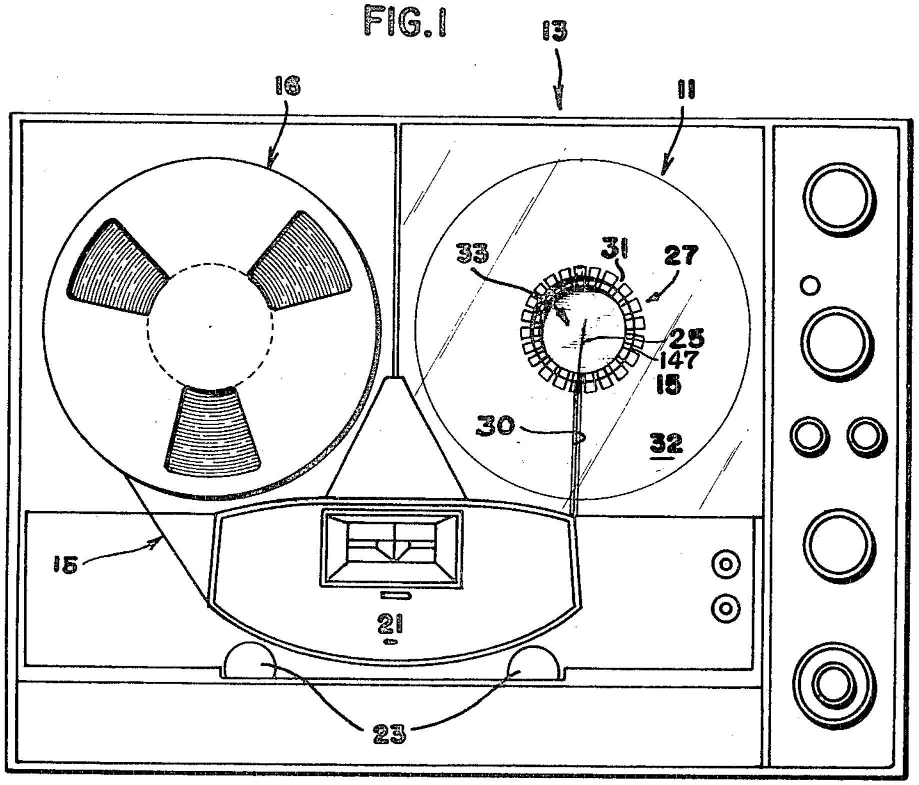
FIG. 1 is a plan view of a magnetic tape recorder having the reel and tape system embodying the novel features of the invention.

As shown in the drawings for purposes of illustration, the invention is embodied in a tape reel 11 for use in a tape recorder 13 in which a strip of tape 15 is stripped from a supply reel 16 and coiled on the reel 11 which is in the takeup position in the magnetic tape recorder. In the illustrated recorder, the tape extending between the supply reel and the takeup reel passes over record, reproduce and erase heads (not shown) which are covered by a housing 21. The tape is fed by means such as a pair of pinch rollers 23 positioned adjacent the housing at spaced locations for pressing the tape against respective capstans (not shown) for the purpose of feeding the tape in a forward or reverse direction.

In accordance with the present invention, a leading end 25 of the tape 15 is quickly threaded into and positively gripped within the tape reel 11 without the use of any special leaders or other materials fixed to the leading tape end 25. The tape is gripped between the first and second sets of gripping members 27 and 29 which are located at a central portion of the reel 11 and which are shiftable from a threading position in which the gripping members are positioned to provide openings or slots 31 to accommodate insertion of the tape end 25 and a gripping position in which the gripping members shift relative to each other to rotate through the slots 31 and grip the tape end 25 therebetween for winding on the takeup reel 11. As will be explained in greater detail, threading of the tape is achieved by merely inserting the tape end 25 edgewise through a radially directed openings 30 in a reel cover 32 into one of the slots 31. If the takeup reel is disposed in a horizontal plane, the tape end 25 is merely inserted edgewise into one of the slots 31, and the initial turning of the tape-gripping members 29 at the commencement of a tape transport operation results in an automatic gripping of the tape against a member 27. As an alternative to this automatic operation, the gripping member may be shifted to grip the tape by a simple momentary operation of an actuator in the form of a pushbutton 33 at the center of the reel. Thus, a simple push of the button 33 results in the positive grip of the leading end of the tape by the takeup reel. It is to be recognized that as an alternative to the depression of the pushbutton 33 that the release of the pushbutton may be used to cause the gripping members to shift to the tape-threading position.

Figure 3:
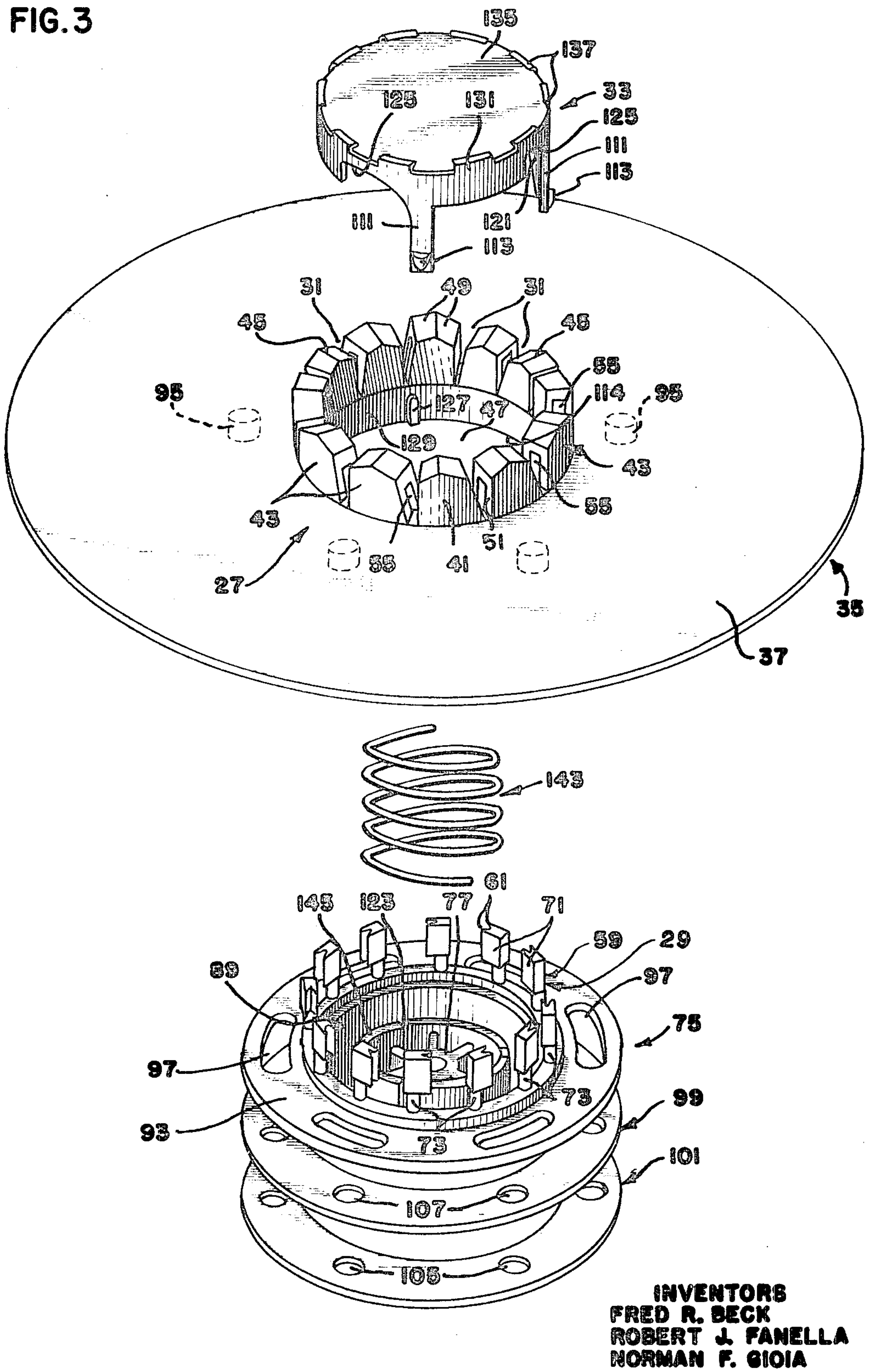
FIG. 3 is an exploded perspective view of the reel.

Referring now in greater detail to the individual elements of the illustrated embodiment of the invention, the reel 11 comprises tape-supporting means in the form of a base 35 which is a disk-shaped member having an outer circular flange 37 and a centrally located tape-supporting surface about which the tape is coiled and supported. Preferably, the first set of gripping members 27 are in the form of a plurality of rigid pointed members or teeth 43 which are spaced circumferentially about a central opening 47 in the base 35 as best seen in FIG. 3. In this instance, curved circumferentially extending walls 41 of the teeth 43 project outwardly from the base 35 and define the tape-supporting surface about which the initial and subsequent coils of tape are wound and supported on the reel. The curved walls 41 are slightly tapered a degree or two, such that at their termination with the base 35 they described a circle of smaller diameter than they describe at the crown of the teeth in order that the first few coils of tape do not telescope away from the base 35.

The preferred reel is defined as being automatic threading in the sense that the edgewise insertion of the tape toward the plane of the base flange 37 results in the tape being positioned within slots 31 between the teeth 43. To this end, the preferred form of teeth are shaped with an upper or outer point 45 from which are inclined top walls 49 which lead into and join downwardly extending sidewalls 51. Thus, the edge of the tape will either be inserted directly into a slot 31 or hit one of the inclined top walls and slide into an adjacent slot directly or move indirectly into a slot by sliding down along one of the vertically inclined sidewalls of the teeth before abutting a bottom wall of the base between the teeth. By way of illustration only, the preferred top walls 49 of the teeth have an inclination of 22° to the horizontal and the sidewalls 51 on the counterclockwise or right sides of the teeth are inclined at an angle of 12° to the vertical while the opposite left sidewalls 51 of the teeth are substantially vertical.

Figure 2:
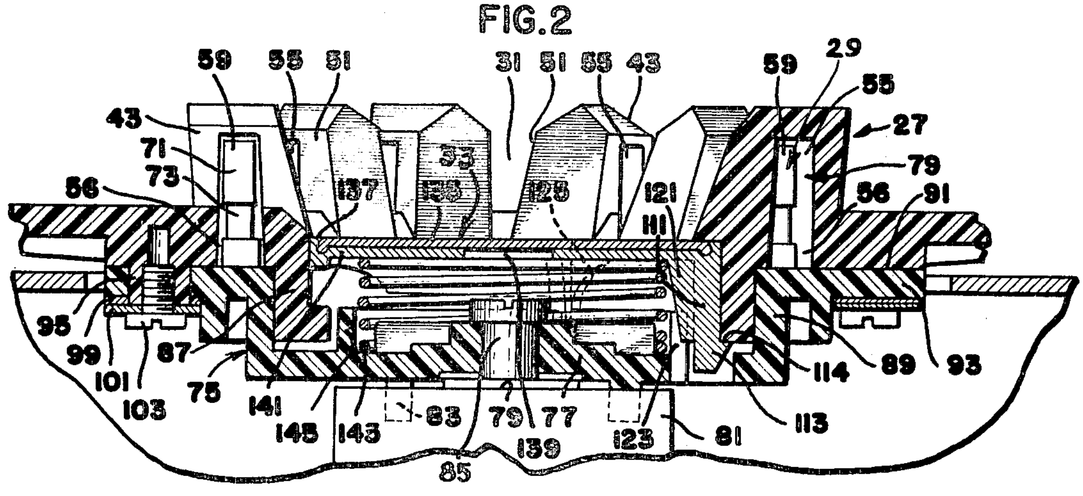
FIG. 2 is a partial enlarged sectional view of the tape reel illustrated in FIG. 1.
Figure 4:
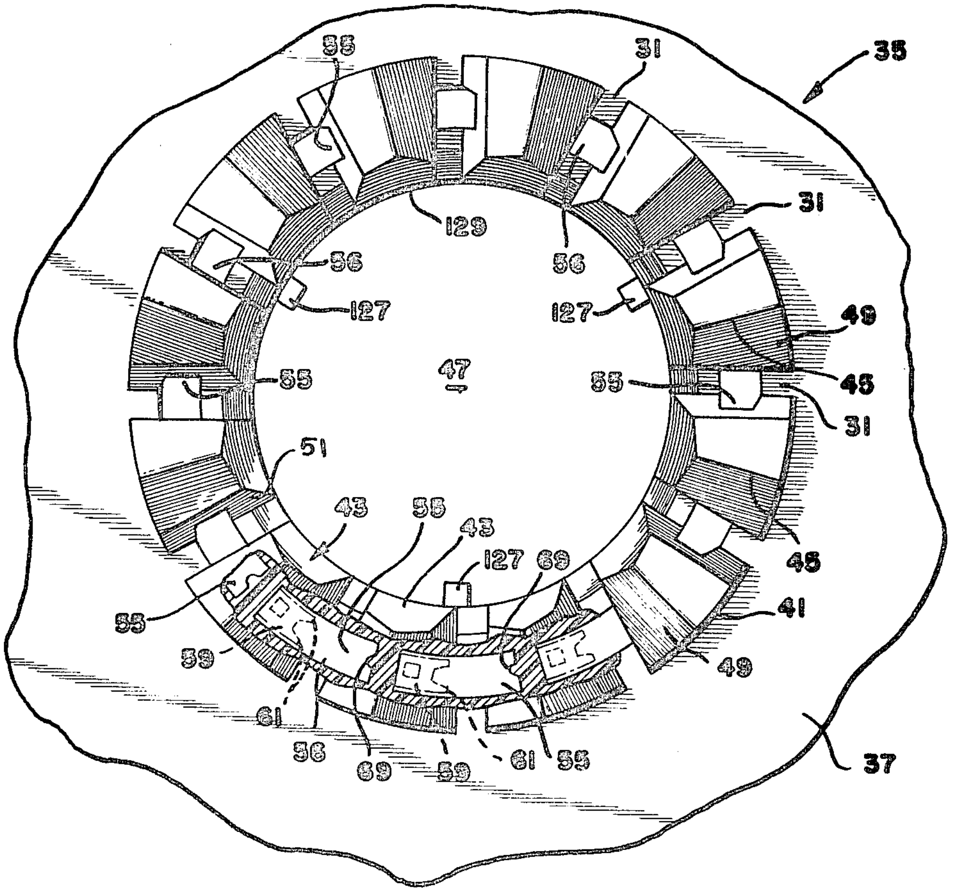
FIG. 4 is a fragmentary, partially broken away plan view of tape-engaging teeth on said reel.

To provide an unobstructed insertion of a tape edge into slots 31 between the teeth 43 of the base, the second set of gripping elements are movable to retracted positions, such as seen in FIG. 4, within chambers 55 formed within the interior of the teeth 43. More specifically, the vertical sidewalls 51 of the teeth are apertured to allow the second set of gripping members to shift into the chambers 55 within the teeth. As best seen in FIG. 2, the rear or underside of the base 35 is provided with a series of slots 56 leading into the upwardly extending chambers 55 so that the second set of gripping members 29, which are in the shape of upstanding fingers 59 on the hub member, may project into the chambers. When the gripping fingers 59 are in the threading or retracted position illustrated in FIG. 4, preferably a plurality of spaced pointed ends 61 on the fingers for engaging the tape are retracted to be substantially aligned with the inclined sidewalls 51 of the teeth. Preferably, the slots 56 in the base 35 are of sufficient circumferential extent that when the fingers 59 rotate to the gripping position, the fingers are completely uncovered as adjacent fingers shift in the counterclockwise direction toward the tape and base. When a tape is present, the tape is gripped by penetration of the finger ends 61 into the adjacent chamber of an adjacent tooth until engagement is achieved with a curved, vertical wall 69 in the interior of the tooth. Preferably, the pointed ends 61 of the fingers and curved wall 69 cause an arcuate bend in the tape gripped therebetween.

To prevent damage to the tape as result of this gripping action and minimize slippage of tape, the tape gripping fingers 59 are preferably formed with upper tape-engaging heads 71 made of a resilient material, e.g., a soft, elastic rubber material or the like. These heads 71 are secured to a hub member 75 by means such as, for example, circumferentially spaced, vertical extending posts 73 integrally connected at their lower ends to the hub member 75.

The hub member 75 is made, for example, of molded plastic and formed with a central portion or disk 77 which is adapted to be driven by and fastened to an upper end 79 of a drive shaft 81 which suitably drives the reel 11 in a forward direction, i.e., a tape-coiling direction. To this end, the hub disk 77 abuts the drive shaft 81 and at least one integral drive pin 83 projects from the hub member into apertures in the drive shaft 81 to turn the reel 11 with turning of the drive shaft. Also, preferably, the reel 11 is releasably fastened to the drive shaft 81 by a screw 85 having a head abutting a top wall of the hub member 77 supports and carries the base member 35 in the radial direction on a depending ring wall 87 on the latter (as seen in FIG. 2), the ring wall being telescoped within a larger encircling wall 89 formed integral to the outer edge of the hub disk 77 and held thereby coaxial with the axis of the drive shaft 81 and the reel 11. The base 35 also has an annular lower wall 91 in a horizontal plane resting on an outer flange 93 of the hub member, which serves to support the base 35 and tape coil in the axial direction.

The path of turning of the base 35 relative to the hub member 75 in a limited arc about the axis of the reel is constrained axially by a series of angularly spaced pins or bosses 95 on the rear face of the base 35 projecting into arcuate, circumferentially extending, elongated slots 97 formed in the outer flange 93 of the hub member 75. The bosses and slots are sized complementary and so located that the base will slide freely and easily relative to the hub member while still axially constraining the same.

Figure 5:
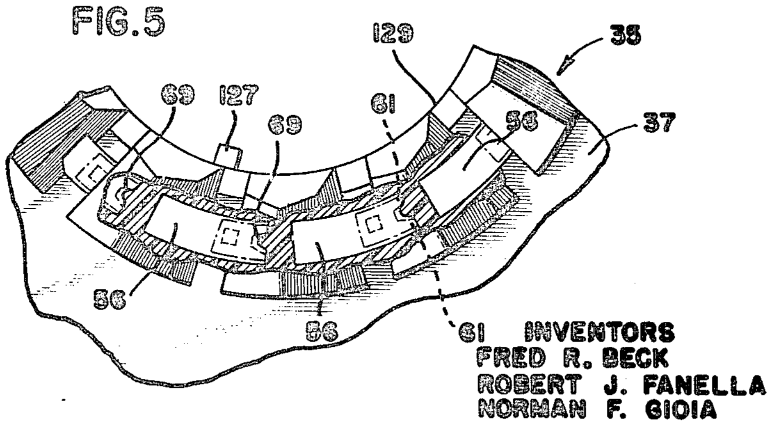
FIG. 5 is a fragmentary view illustrating the teeth of FIG. 4 in a tape-gripping position.

For the purpose of assuring that the gripping teeth 43 and gripping fingers 59 are retained in either the retracted threading position or in gripping position, particularly at the commencement of winding or termination of unwinding, the base 35 and hub member 75 are preferably provided with a friction means which exerts a retarding force preventing an unwanted movement of the base relative to the hub member 75. The preferred friction means includes a brake pad 99 of friction material formed in a generally ringlike construction disposed between a lower retainer ring 101 and the underside of the hub member 75. A series of screws 103 have shanks projecting through openings 107 and 105 in the brake pad and retainer ring, respectively, and are threaded into the bosses 95 on the base 35. The screws 103 bearing against the underside of the retainer ring are tightened to give the desired amount of retarding force. Preferably, the retaining force is sufficiently light that it is readily overcome with operation of the pushbutton 33. Also, it will be understood that the friction of the brake pad acts, after the pushbutton has been pushed and released, to assure that the gripping teeth and fingers retain their position particularly until the reel begins to wind a coil or two of tape. As will be explained, the preferred turning of the base is in the clockwise direction relative to the gripping fingers 59 as viewed in FIGS. 4 and 5, which is opposite to the direction the reel 11 revolves when winding a tape thereon.

The pushbutton 33 for shifting the gripping teeth and fingers to grip the tape is preferably connected by means of a catch or snap fit type of engagement to the hub member 75 by means of depending, axially extending legs 111 having catches 113 on the lower ends thereof catching beneath a shoulder 114 as best seen in FIG. 2, of the wall 87 of base 35. As best seen in FIG. 2, suitable openings are formed in the disk 77 of the hub member 75 to admit the catches 113 and allow the latter to move down therethrough when the pushbutton 33 is depressed. The catches 113 have upper flat or catching surfaces for insertion under the shoulder 114. It is to be understood that when the pushbutton and catch carrying legs are being inserted, the lower ends of the legs are flexed inwardly until the catches are beneath the shoulder 114 at which time the legs will return outwardly and position the catches 113 beneath the shoulder 114. In this position, the top of the pushbutton is disposed beneath the tape-gripping teeth and fingers so as not to interfere with the placement of the tape end into a slot between the tape-gripping teeth and fingers. Projecting radially inward at each leg 111 of the pushbutton is a key 121 which fits in a slot or keyway 123 in the hub member to assure that the base 35 rather than the pushbutton turns as the latter is depressed.

A preferred manner of causing a shifting of the base 35 and its teeth 43 to the tape-gripping position in response to operation of the pushbutton 33 is by a cam means such as cam surfaces 125 and cam followers 127 which are formed on the pushbutton 33 and the base 35, respectively. More specifically, the cam followers 127 on the base are in the form of three equally spaced projections projecting radially inwardly and spaced circumferentially about an inner circular wall 129 of the base which wall defines the cylindrical opening 47 for reception of the pushbutton. The upper surfaces of the projections 127 are rounded and serve as cam followers which will be forced to turn as the downwardly curved surfaces on the pushbutton cams exert forces thereon. In the illustrated embodiment of the invention, the stroke of the pushbutton and lengths of cam surfaces 125 of the pushbutton are such that the maximum downward displacement of the pushbutton results in the base 35 turning about 20° to cause the desired tape gripping by the gripping fingers and teeth. The preferred form of pushbutton is provided with inturned flanges on the top edge thereof to receive and hold a decorative disk 135 which is snap fitted beneath inturned flanges 137 on pushbutton wall 131. The disk 135 covers the central aperture 139, FIG. 2, in a top wall 141 of the pushbutton against which bears the top coil of the pushbutton return spring 143 which is a coiled compressed spring having its lower coil resting on the top of the hub member 75 adjacent a spring retainer wall 145 which has the keyway slots 123 therein. The spring 143 will thus lift the pushbutton as soon as the operator releases the same.

From the foregoing, it will be seen that the illustrated takeup reel 11 may be disposed in either a generally vertical or horizontal plane with teeth 43 unobstructed for edgewise insertion of a circular tape through the opening 147 in the reel cover 32. When the reel 11 is in a horizontal plane, the pushbutton 33 need not be operated as turning of the hub member by the drive shaft will automatically cause a gripping of the tape. On the other hand, with the reel 11 in a vertical plane, it will be desirable to use the pushbutton to prevent the tape end from falling from the reel before the base is turned. By simply inserting a finger through through the opening 147 and depressing the pushbutton 33, the cam surfaces 125 thereon thrust against the cam followers 127 on the base 35 and cause the latter to turn relative to the hub member 75. The base 35 turns clockwise, as viewed in FIGS. 4 and 5, which is opposite the direction the reel turns to grip the tape between pairs of fingers 59 and teeth 43. When the drive shaft 81 begins to turn the takeup reel, the hub member 75 and the gripping fingers 59 move more tightly against the tape which, in turn, is forced more tightly against the teeth 43. The turning torque from the drive shaft is in effect transmitted through the tape to the base 35. The tape winds about the outer circumferential surfaces 41 of the teeth 43.

After the tape 15 is wound on the takeup reel 11, the tape is often rewound back on the supply reel 16 and preferably the end 25 of the tape on the takeup reel 11 will release and slip free of the takeup reel 11. With the illustrated takeup reel 11, a conclusion of the rewind operation and a final pull on the tape in the reverse feed direction will be sufficient to slow the base 35 relative to the rotating hub member 75 and overcome the friction of the brake pad holding the base in the gripping position. Thus, the leading end of the tape will be free to be pulled from the teeth 43 and returned to the supply reel 16.

From the foregoing, it will be seen that the reel positively grips the tape which need not have any special leaders or other materials fixed thereto, and this gripping is achieved after the tape is threaded automatically. A simple pushbutton which is easy and simple to use shifts the gripping members to grip the tape. Also, the preferred construction employs a molded plastic base and hub member which may be formed inexpensively and with considerable degree of accuracy to provide a commercially competitive reel from a cost standpoint.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A tape reel comprising a base having a flange and a central axis through said base for rotation thereabout, a plurality of teeth projecting substantially normal to said base and substantially parallel to said axis, said teeth having free ends thereof exposed and spaced circumferentially to define a circumferential series of open slots to accept an edgewise insertion of the longitudinally extending edge of the tape into said slots, a hub associated with said base and mounted coaxially therewith for relative turning movement to said base about said axis, a plurality of tape-gripping fingers on and spaced circumferentially about said hub and positioned adjacent said teeth in a threading position to leave exposed said series of slots to accept said endwise insertion of said tape therebetween, said tape-gripping fingers and said teeth being positioned with relative rotation between said base and said hub to substantially close the slots between said teeth and said fingers and to grip the tape for winding on said base.

2. A tape reel comprising a base having a surface for supporting said tape when wound in a coil and mounted for rotation about a central axis through said base, a plurality of teeth on said base projecting substantially parallel to said axis and being spaced circumferentially about said axis, a hub having a plurality of tape-gripping fingers associated with said base for turning relative thereto between a threading position in which said fingers are spaced from said teeth to define a slot for reception of the tape and a tape-gripping position in which said fingers substantially close the slot between said teeth and fingers and grip the tape therebetween for holding the tape for winding on said surface with rotation of said reel and means operable to shift the hub relative to said base to move said teeth and fingers into said tape-gripping position and said threading position.

3. A reel in accordance with claim 2 in which said means operable to shift said hub relative to said base includes a manual operator and a return spring for moving said toothed hub relative to said base and to the other of said positions.

4. A reel in accordance with claim 3 in which said manual operator is a pushbutton located centrally with respect to said base and said hub for depressing inwardly relative to said base to cause a relative turning movement between said hub and said base.

5. A reel in accordance with claim 2 in which said means operable to shift said hub relative to said base includes cam surfaces.

6. A reel in accordance with claim 2 in which friction surfaces are operatively associated with said hub and said base to releasably and frictionally hold said base and said hub in said gripping and threading positions.

7. A reel in accordance with claim 5 in which said hub and base are disposed relative to one another so that the turning of said hub in the winding direction exerts forces through said tape on said base and increases the grip of said tape therebetween.

8. A reel in accordance with claim 2 in which the tape-engaging fingers are formed of resilient material for engaging the tape and for forcing the same against said teeth.

9. In a tape reel having a base and a hub located centrally of said base and coaxial with a central axis through said base and about which axis said tape is coiled, the improvement comprising a plurality of first tape-gripping members mounted on said base and a plurality of second tape-gripping members mounted on said hub and an actuating means on said tape reel operable to shift said first and second gripping members between a tape-gripping position in which said first and second gripping members move relative to each other to grip the taper therebetween and a tape-threading position in which said first and second members move relative to each other in a direction to release said tape.

10. A tape-threading system for a machine comprising a tape reel, a separate cover for said reel having a slot therein providing access to said reel, a base for said reel, a hub associated with and located centrally of said base and coaxial with a central axis through said base, a plurality of first tape-gripping members mounted on said base and a plurality of second tape-gripping members mounted on said hub and an actuating means on said tape reel operable to shift said base relative to said hub and move first and second gripping members between a tape-gripping position in which said first and second gripping members move relative to each other to grip the tape therebetween and a tape-threading position in which said first and second members move relative to each other in a direction to release said tape.

* * * * *